United States Patent [19]
Chavez et al.

[11] Patent Number: 6,163,470
[45] Date of Patent: Dec. 19, 2000

[54] EMI FILTER FOR AN INRUSH RELAY

[75] Inventors: Francisco Higinio Chavez, Dallas; Jin He, Plano; Greg P. Jorgenson, Quinlan; Rui Liu, Plano, all of Tex.

[73] Assignee: Lucent Technologies, Inc., Murray Hill, N.J.

[21] Appl. No.: 09/415,200

[22] Filed: Oct. 7, 1999

[51] Int. Cl.[7] .................................................. H02H 7/125
[52] U.S. Cl. ............................................ 363/53; 323/908
[58] Field of Search ................................ 363/50, 53, 125; 323/908

[56] References Cited

U.S. PATENT DOCUMENTS

| | | | |
|---|---|---|---|
| 4,236,198 | 11/1980 | Ohsawa et al. | 363/49 |
| 4,321,447 | 3/1982 | Lamb | 219/721 |
| 4,503,365 | 3/1985 | Kirk | 315/310 |
| 4,910,654 | 3/1990 | Forge | 363/49 |
| 5,187,653 | 2/1993 | Lorenz | 363/89 |
| 5,513,088 | 4/1996 | Williamson | 363/20 |
| 5,920,186 | 7/1999 | Ninh et al. | 323/901 |

*Primary Examiner*—Adolf Deneke Berhane
*Attorney, Agent, or Firm*—Locke Liddell & Sapp LLP

[57] ABSTRACT

A filter for an inrush relay, the relay having a relay coil having first and second leads includes a common-mode inductor connected to the relay coil leads across the relay coil. A first capacitor is connected to the first relay coil lead and a chassis ground potential. A second capacitor is connected to the second relay coil lead and the chassis ground potential. A third capacitor is connected to the relay coil leads across the relay coil. A first resistor is connected to the first relay lead, and a second resistor is connected to the second relay coil lead. The inductor and first and second capacitors form a high frequency common-mode filter. The third capacitor and first and second resistors form a high frequency differential mode filter.

7 Claims, 1 Drawing Sheet

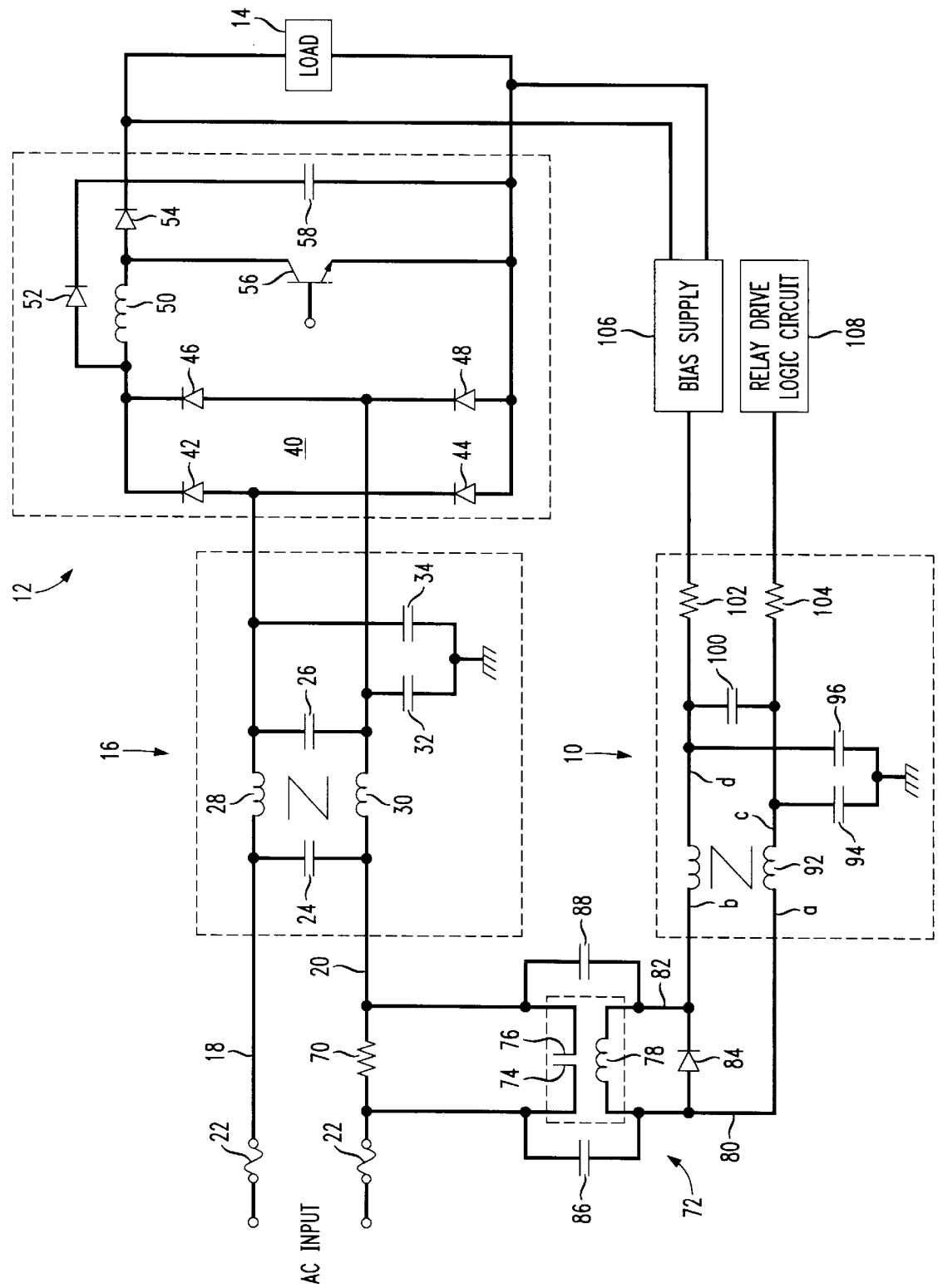

EMI FILTER FOR AN INRUSH RELAY

TECHNICAL FIELD OF THE INVENTION

The present invention relates to EMI filters, and more particularly to a high frequency differential mode and high frequency common-mode filter for an inrush relay.

BACKGROUND OF THE INVENTION

During initial power on of a power supply or a rectifier, a large input current will charge the bulk capacitor bank of the power supply or rectifier, since the capacitor voltage was at zero before power turn on. This current is a function of the input peak voltage and the input source impedance and is generally referred to as an inrush current. Inrush current must be limited to a certain level. Without such limitation, the inrush current may trip the input protective devices such as, for example, circuit breakers and fuses. The inrush current also generates unwanted noise and affects equipment connected across the power mains.

Inrush resistors are typically used to limit the inrush current level and are connected between the input AC line and the bulk capacitor bank. The inrush resistor must, however, be removed from the circuit during the normal operation of the power supply to achieve high efficiency. A DC power driven inrush AC relay is typically used in the power supply and rectifier to bypass the inrush resistor during normal operation of the power supply or rectifier. Where the inrush current limiting resistor and inrush relay combination is located between the power supply diode bridge rectifier and the bulk filter capacitor bank, this current limiting scheme can not limit the inrush current into the "X" capacitor, across the AC lines, of the input EMI filter. In order to overcome this shortcoming, the inrush resistor and the inrush relay combination is relocated before the input EMI filter. However, where the inrush resistor and inrush relay are located before the EMI filter section, power supply EMI deficiencies result. In the construction of the electromechanical relay, there exists parasitic capacitors between the relay DC coil and the AC power contacts of the relay. Since the relay coil is driven by a low voltage onboard bias via two long leads, the high frequency switching noise (differential mode and commonmode noise) is conductively coupled to the AC input without suppressing prior to the EMI filter. The two long control leads of the relay coil also become a coupling channel to transmit noise directly to the noise receptor circuit, including the input EMI measuring equipment.

A need has thus arisen for an EMI filter to suppress noise and to minimize noise transmission and coupling introduced from a power supply or rectifier into the AC source due to use of an inrush relay before the input EMI filter section.

SUMMARY OF THE INVENTION

A filter for an inrush relay, the relay having a relay coil having first and second leads is provided. The filter includes a four terminal common-mode inductor, two terminals of which are connected to the relay coil leads across the relay coil. A first capacitor is connected to the third terminal of the inductor and a chassis ground potential. A second capacitor is connected to the fourth terminal of the inductor and the chassis ground potential. A third capacitor is connected across the inductor at the side opposite the relay coil. A first resistor is connected to the first relay coil lead, and a second resistor is connected to the second relay coil lead. The inductor and first and second capacitors form a high frequency common-mode filter. The third capacitor and first and second resistors form a high frequency differential mode filter.

BRIEF DESCRIPTION OF THE DRAWINGS

For a more complete understanding of the present invention and for further advantages thereof, reference is now made to the following Description of the Preferred Embodiments taken in conjunction with the accompanying Drawing which is a schematic block diagram of the present filter.

DESCRIPTION OF THE PREFERRED EMBODIMENTS

Referring to the FIGURE, a filter in accordance with the present invention is illustrated, and is generally identified by the numeral 10. Filter 10 is utilized with a power supply or rectifier, generally identified by the numeral 12 which rectifies an AC power to a regulated or unregulated DC power and which provides power to a load 14. Differential mode and common-mode EMI filter stages, generally identified by the numeral 16 suppress the switching noise generated from the power supply or rectifier 12. The AC input power is applied on power lines 18 and 20. each having a protective device 22.

EMI filter stage 16 includes two large EMI "X" class capacitors 24 and 26; inductors 28 and 30; and "Y" class capacitors 32 and 34. Power supply 12 includes a full wave diode bridge 40 including diodes 42, 44, 46, 48; inductor 50; diodes 52 and 54; switch 56; and bulk DC filter capacitor 58. Charging of capacitors 24, 26 and 58 results in the inrush current.

Connected in power line 20 is an inrush resistor 70. Connected across inline resistor 70 is an inline relay, generally identified by the numeral 72. Inline relay 72 includes AC power contacts 74 and 76 and a relay coil 78. Relay coil 78 includes relay leads 80 and 82. Connected across relay coil 78 is a free wheeling diode 84. Also shown in the FIGURE are parasitic capacitors 86 and 88 representing parasitic capacitance existing within relay 72 between relay coil 78 and AC power contacts 74 and 76 respectively.

In accordance with the present invention, filter 10 is connected across relay coil 78 to relay leads 80 and 82. Filter 10 includes a four terminal common-mode inductor 92. Terminals a and b are connected to relay coil leads 80 and 82, respectively. Filter 10 further includes "Y" type capacitors 94 and 96 connected to inductor 92 terminals c and d, respectively, and a chassis ground potential. Inductor 92 and capacitors 94 and 96 form a high frequency common-mode filter and provides two low impedance line-to-chassis common-mode noise paths and two high impedance line-to-relay AC contact 74, 76 paths. The high frequency commonmode filter portion of filter 10 thereby makes it difficult for common-mode noise to be coupled to the AC input of power supply or rectifier 12.

Filter 10 further includes a capacitor 100 connected across inductor 92 to terminals c and d . A resistor 102 is connected to inductor 92 terminal d and a resistor 104 is connected to inductor 92 terminal c. Capacitor 100 and resistors 102 and 104 form a high frequency differential mode filter for relay 72. Filter 10 is powered from house keeping bias switching supply 106 which in turn is powered from main power supply or rectifier 12. Capacitor 100 and resistors 102 and 104 suppress the differential mode noise conducted from supply 106 of power supply or rectifier 12 and return leads from relay drive logic circuitry 108. While the input EMI filter of the power supply carries the entire load current and withstands the line voltage, the inrush relay EMI filter proposed does not carry away load (power) current and sees the high voltage. Thus, the present filter is a low cost and a small sized filter.

It therefore can be seen that the present filter 10 provides EMI filtering for an inrush relay located before the input EMI filter of the main power supply or rectifier to suppress noise and minimize noise transmission coupled from the relay coil drive circuit to the relay AC contacts.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. In a power supply system having an AC input, an EMI filter having a differential mode capacitor connected across the AC input, an inrush resistor and an inrush relay connected across the inrush resistor, the inrush resistor and inrush relay located between the AC input and EMI filter, the inrush relay having a coil and contacts with first and second leads, an EMI protection circuit for suppressing EMI noise generated by a switching power supply used to power the inrush relay coil and which noise is coupled through the relay coil and relay contacts, comprising:

a high frequency differential mode filter connected across the inrush relay coil to thereby limit inrush current flowing into the differential mode capacitor while suppressing the EMI noise generated by the power supply.

2. The protection circuit of claim 1 wherein said high frequency differential mode filter comprises:

a capacitor connected across the inrush relay coil;

a first resistor connected to the first lead of the inrush relay coil; and a second resistor connected to the second lead of the inrush relay coil.

3. In a power supply system having an AC input, an EMI filter having a differential mode capacitor connected across the AC input, an inrush resistor and an inrush relay connected across the inrush resistor, the inrush resistor and inrush relay located between the AC input and EMI filter, the inrush relay having a coil and contacts with first and second leads, an EMI protection current for suppressing EMI noise generated by a switching power supply used to power the inrush relay coil and which is noise coupled through the relay coil and relay contacts, comprising:

a high frequency common-mode filter connected across the inrush relay coil to thereby limit inrush current flowing into the differential mode capacitor while suppressing the EMI noise generated by the power supply.

4. The protection circuit of claim 3 wherein said high frequency common-mode filter comprises:

a common-mode inductor connected across the inrush relay coil;

a first capacitor connected to the first lead of the inrush relay coil and a chassis ground potential; and a second capacitor connected between the second lead of the inrush relay coil and chassis ground potential.

5. The protection circuit of claim 3 and further including:

a high frequency differential mode filter connected across the inrush relay coil.

6. The protection circuit of claim 5 wherein said high frequency differential mode filter comprises:

a capacitor connected across the inrush relay coil;

a first resistor connected to the first lead of the inrush relay coil; and a second resistor connected to the second lead of the inrush relay coil.

7. The protection circuit of claim 6 wherein said high frequency common-mode filter comprises:

a common-mode inductor connected across the inrush relay coil;

a first capacitor connected to the first lead of the inrush relay coil and a chassis ground potential; and a second capacitor connected between the second lead of the inrush relay coil and chassis ground potential.

* * * * *